SEARCH ROOM

T5272 E

Feb. 25, 1958 F. M. HOM 2,824,956

PULSE CONTROL CIRCUIT FOR TRANSMITTING AND RECEIVING JAMMING SYSTEM

Filed Dec. 14, 1945 2 Sheets-Sheet 1

INVENTOR.
Freeman M. Hom

BY M. C. Hayes

ATTORNEY

INVENTOR.
FREEMAN M. HOM
BY M. C. Hayes
ATTORNEY 2,824,956

PULSE CONTROL CIRCUIT FOR TRANSMITTING AND RECEIVING JAMMING SYSTEM

Freeman M. Hom, San Diego, Calif., assignor to the United States of America as represented by the Secretary of the Navy Application December 14, 1945, Serial No. 635,096

13 Claims. (Cl. 250—17)

This invention relates to radio transmitting and receiving systems, and particularly, to electrical control circuits for such systems.

It is a principal object of the invention to provide an improved adjustable timing circuit for multiple units constituting the system of the invention.

Another object is to provide a novel radio transmitting and monitoring system having an adjustable timing circuit for the transmitter and monitoring devices, whereby the system may be advantageously used as a communication jamming organization.

For the purpose of jamming enemy communication, it has been the practice manually to set a transmitter (or one of several oscillators in a broad-band transmitter) to an enemy channel to be jammed. With the aid of a cathode-ray panoramic receiver, this system was improved to include a mechanical switching system alternately disabling the monitoring system and permitting transmitter operation and, subsequently, suppressing transmitter operation during the monitoring or "look-through" interval. One form of monitoring system now in use desirably includes a receiver, the frequency of which is swept across a predetermined band, the sweep being synchronized with the horizontal sweep of a cathode-ray oscilloscope. The output of the receiver is applied to the upper of the vertical deflection plates of the oscilloscope so that any signal within the spectrum searched will produce a narrow upward peak on the oscilloscope. The oscillator in the transmitter, the output of which is coupled to the lower of the vertical deflection plates, produces a downward peak which may be adjusted to coincide with the enemy signal by adjustment of the oscillator frequency. By causing the transmitting and monitoring intervals to recur frequently, as several times a second, a continuous monitoring of the spectrum can be maintained. Multiple signals can be jammed using this monitoring system and multiple oscillators in a broad-band transmitter. The duration of transmission period desirably is many times the duration of the monitoring interval for effective jamming transmission.

Rather than relying solely on the oscilloscope, it has been found expedient to monitor the band additionally or alternatively with an audio section in the receiver.

It is a practical requirement for satisfactory operation that the oscilloscope and the receiver should both be blanked for the transmission interval and for a brief period thereafter to allow for the decay of transients. It is also necessary to synchronize the cathode-ray sweep and the sweep of the panoramic receiver so that it coincides with the interval during which the receiver and the oscilloscope are not ineffective. To accomplish this control, a motor-driven mechanical switching system has been used with some success. However, where it is desirable to vary the transmission period relative to the entire cycle (called the "duty-cycle") and to vary the cycle frequency, mechanical switching systems have been found inflexible and unsuited. Also, mechanical systems are subject to failure in such severe use, and to the chattering and erratic action characteristic of mechanical contacts.

According to the present invention, an electronic timer is provided for accomplishing several necessary control functions heretofore accomplished by mechanical means, as described above. The electronic timer is adjustable as to length of cycle and as to duty-cycle, and is not subject to wear and consequent failures. In carrying out the invention, a circuit having dual output portions is periodically triggered so as to provide a long control pulse from one portion for transmitter control and a short pulse for the remainder of the cycle for control of the monitor. The latter output is in the form of a square wave, and this is used to drive a saw-tooth generator. By feeding the resulting intermittent saw-tooth wave to a stage normally biased beyond cutoff, a portion of the sloping saw-tooth is removed. The remainder of the saw-tooth, commencing approximately a millisecond after the transmitter pulse has been interrupted for a pulse frequency of ten per second, is used to control the cathode-ray tube sweep and the tuning of the panoramic receiver. This output is differentiated to yield a square wave which, when suitably amplified, limited and corrected for polarity, is used to blank the cathode-ray tube and receiver portions of the organization.

A better understanding of the invention as to its details and its further merits will be gained from the following detailed description of a preferred embodiment.

In the drawing:

Figs. 1A and 1B, taken together, constitute a block and wiring diagram of a preferred embodiment of the invention;

Figs. 2–9, inclusive, are wave-form diagrams of the voltage at the parts of the circuit in Figs. 1A and 1B indicated by arrows;

Figures 1A, 1B, 2, 3, 4, 5, 6, 7, 8, 9, 10:
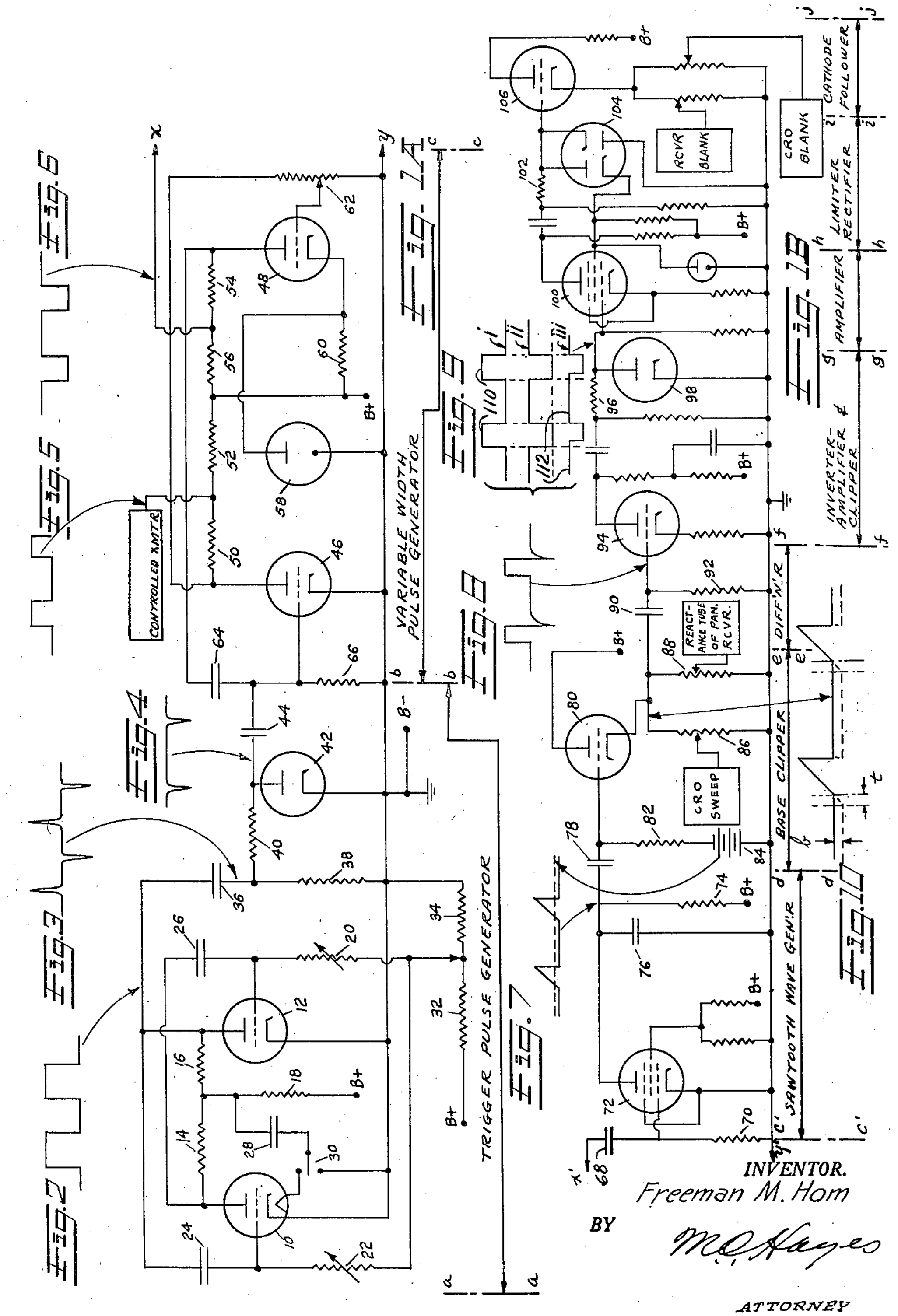
Fig. 10 is a wave form of the saw tooth wave in Figure 7 somewhat modified.

In Fig. 1A, an unsymmetrical multivibrator is shown comprising tubes 10 and 12, together with the associated plate resistors 14, 16, signal-impressing resistor 18, grid-return resistors 20 and 22, cross-coupling capacitors 24 and 26, and external signal coupling capacitor 28. The output of the multivibrator is a square wave, as shown in Fig. 2. Switch 30 permits synchronization of the multivibrator by connection to a point in an alternating current circuit, such as at the filament of tube 10, or to any other frequency standard or synchronizing source. Capacitor 28 provides this coupling. Resistors 20 and 22 in the grid circuits of tubes 10 and 12 are returned to a positive direct-current potential as from a voltage divider connected between B+ and ground, comprising resistors 32 and 34. Such positive drive causes the sharp square wave output (Fig. 2) to be produced by the multivibrator and improves its stability. Each of resistors 20 and 22 (or either of them) is adjustable for frequency control of the multivibrator. This multivibrator is of known design and no further description is thought necessary.

The output of the multivibrator is applied to a differentiating circuit in the form of a series connection of capacitor 36 and resistor 38 at the common junction of which connection appears the positive and negative pulses shown in Fig. 3. In order to eliminate the positive pulses, the output of the differentiating circuit is applied through resistor 40 to rectifier 42 at the plate electrode of which a rectified version of the waveform of Fig. 3 appears comprising a series of spaced negative voltage pulses, as at Fig. 4.

The circuit arrangement thus far described, and extending between lines *a—a* and *b—b* (Fig. 1A), may be regarded functionally as a trigger-pulse generator for generating the negative-voltage triggering pulses of the type illustrated at Fig. 4. Sharpening of these pulses, if required, may be accomplished by a pulse-sharpening circuit comprising capacitor 44 and resistor 66.

The negative-voltage triggering pulse is used to actuate a variable-width-pulse generator, shown between lines *b—b* and *c—c* (Fig. 1A) as being of the one-shot multivibrator or flip-flop type and including a pair of triode tubes 46, 48 and a voltage regulator tube 58.

The cathode of tube 46 is grounded and its plate is connected to B+ through resistors 50 and 52, in series. The cathode of tube 48 is maintained at a high positive potential by means of voltage regulator 58 between said cathode and ground and a resistor 60 between B+ and cathode. The plate of tube 48 is connected to B+ through resistors 54 and 56 in the order mentioned. The grid of tube 48 is direct-coupled to the plate of tube 46 by means of a potentiometer 62 connected from the plate of tube 46 to ground. By adjusting the potentiometer, it is possible to adjust the bias on the grid of tube 48 so as to maintain that tube normally beyond cutoff. The plate of tube 48 is coupled through capacitor 64 to the grid of tube 46, which grid is returned to ground through resistor 66.

In operation of this flip-flop unit, when one of the negative pulses shown in Fig. 4 is impressed on the grid of normally conducting tube 46, the pulse operates to drive the tube suddenly beyond cutoff causing a sharp decrease in plate current therein. (Tube 46 ordinarily passes a constant current for lack of grid bias.) This decrease in plate current results in a sudden rise in voltage across potentiometer 62 due to a decrease in the voltage drop across resistors 50 and 52, and this positive shift of grid voltage causes tube 48 to start conducting. Tube 48 remains conductive and at a constant rate so long as tube 46 remains at cutoff. The input pulse to the grid of tube 46 and the consequent negative drive from the plate of tube 48 charge capacitor 64 negatively, and the charged capacitor 64 maintains tube 46 at cutoff until the charge leaks off through resistor 66 sufficiently to allow some plate current to flow. At this point, the voltage across potentiometer 62 starts to diminish causing a change in plate current of tube 48 and causing a positive potential change to start discharging capacitor 64, correspondingly affecting the grid of tube 46. This action builds up substantially instantaneously so as to drive tube 48 to its initial cutoff condition and restore full plate current in tube 46. The cycle is repeated for each successive negative triggering pulse applied from the trigger generator through capacitor 44.

Tube 48 remains cut off for a period partly determined by the RC ratio of capacitor 64 and resistor 66 (provided the stray capacity and additional resistance in the circuit are negligible relative to these elements). Additionally, potentiometer 62 provides an adjustment for the conductive interval of tube 48, by determining the voltage to which capacitor 64 is charged and hence determining its discharge time before tube 46 starts conducting. The ratio of the conducting period of tube 46 compared with the period of the cycle is referred to in the art as the "duty-cycle." A transmitter 51 controlled by tube 46 receives a control impulse from the junction of output voltage divider resistors 50 and 52. The remainder of the communications jammer, e. g. the monitoring device, derives its control drive from the junction of voltage-divider resistors 54 and 56. Fig. 5 illustrates the control signal for the transmitter, whereas Fig. 6 illustrates the signal, which when modified in the manner to be described, yields a signal for controlling the monitoring device.

The signal of Fig. 6 is a mirror image of the transmitter control signal (Fig. 5) and is utilized to drive a saw tooth wave generator, shown in Fig. 1B as included between lines *c'—c'* and *d—d*. It will be understood that the circuits of Figs. 1A and 1B are continuous as by connection of points *x*, *y* of Fig. 1A to points *x'*, *y'* of Fig. 1B.

As shown, the rectangular wave is applied to the grid of tube 72 of the saw tooth wave generator through capacitor 68. This grid is returned to ground through resistor 70. Tube 72 normally is highly conductive for lack of grid bias. Resistor 74 is connected between B+ and the plate of tube 72, and capacitor 76 is connected between that plate and ground. Ordinarily there is a very large voltage drop across resistor 74. When the grid of tube 72 is suddenly driven negative, as by the application of the rectangular wave, the tube is cut off, and capacitor 76 commences a steady charging rate (over a brief time interval) as determined by resistor 74. Resistor 74 and capacitor 76 are so proportioned that they develop a saw-tooth voltage wave of the form shown in Fig. 7.

The output of the saw tooth wave generator is modified in form by means of base clipping circuit, illustrated between lines *d—d* and *e—e* and comprising an amplifier stage normally biased beyond cut-off. Thus, as shown, the voltage wave (Fig. 7) is applied, through capacitor 78, to the grid of tube 80, which grid is returned through resistor 82 to a cutoff bias supply 84. When the positive saw-tooth wave is applied to the grid of tube 80, therefore, this tube does not commence conducting until the grid voltage has risen above cutoff bias, shown by the dotted line in Fig. 7, which illustrates the bias voltage beyond cutoff in relation to the saw-tooth signal. The base-clipped saw-tooth wave output of tube 80 is illustrated in Fig. 10 and is obtained from cathode resistors 86 and 88, which preferably are potentiometers, to provide adjustable saw-tooth voltage drive for the cathode-ray tube sweep and for the reactance tube that controls the tuning of the panoramic receiver. The remaining portion of output of tube 80 is used to drive a differentiating circuit included between lines *e—e* and *f—f* (Fig. 1B).

As illustrated, the differentiating circuit may comprise a capacitor 90 and a resistor 92, whereby the square wave of Fig. 8 is obtained. This wave is thereupon fed to an inverter-amplifier and clipper stage included between lines *f—f* and *g—g* where it is amplified by tube 94 and the wave-form has its undesirable negative portions trimmed by a clipper comprising resistor 96 and rectifier 98. The squared output is then of the form of the lowest curve in Fig. 9, and is amplified in tube 100. The amplitude is limited by resistor 102 and biased rectifier unit 104. The resultant signal, then applied to cathode-follower stage 106, is available for receiver blanking and cathode-ray tube blanking circuits, which may include appropriate polarity and amplitude controls not here disclosed.

In Fig. 9 are three curves designated *i*, *ii* and *iii*. The top and center curves *i* and *ii*, respectively, are those of Figs. 5 and 6, heretofore described and here reproduced for comparison with the lowest curve *iii*, which is the form of the output signal derived from the inverter-amplifier and clipper and used for receiver and oscilloscope blanking. Parts 110 of curve *i* represent the components of the voltage that block operation of the transmitter 51, and parts 112 of curve *iii* represent the components of the voltage that block operation of the receiver and the oscilloscope. Thus, it will be seen that the receiver and oscilloscope remain ineffective, as indicated in Fig. 9, for an interval *t* slightly longer than the transmitter off period. The manner of accomplishing such a time differential will be understood from a consideration of the wave form of Fig. 10. The bias voltage beyond cutoff, supplied by battery 84 and represented by distance *b*, prevents the response of tube 80 to the saw-tooth wave until it has risen an appreciable amount. Beyond this point, it follows the saw-tooth voltage impressed. The solid curve represents the output of tube 80. The time interval *t* is the desired delay before the operation of the monitor, while the transients in the transmitter have died down. The trailing edge of the saw-tooth wave inclines slightly, although it is not so shown in the drawing. When the saw-tooth wave of Fig. 10 is differentiated, the trailing, sharply sloping portion is replaced by the negative peaks of Fig. 8. When these are clipped, there is a very brief time interval remaining between the time the transmitter is blanked and the time the monitor starts operation.

Figure 11:
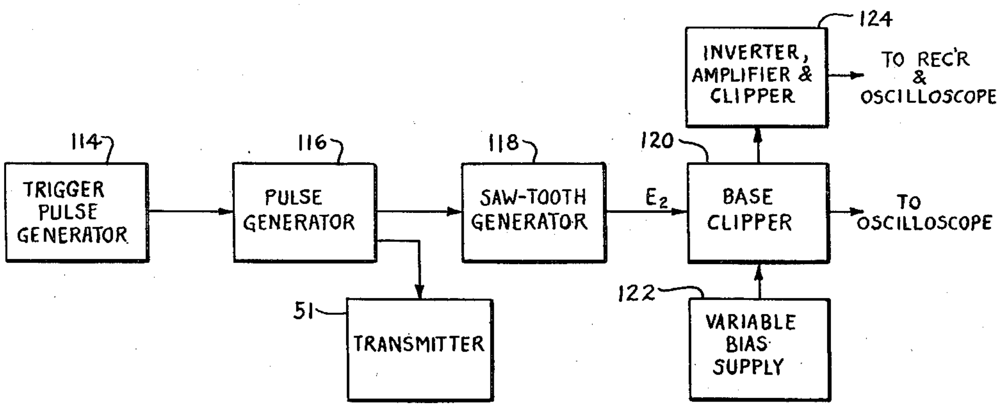
Fig. 11 is a block diagram illustrative of the timing circuit of the invention.
Figure 12:
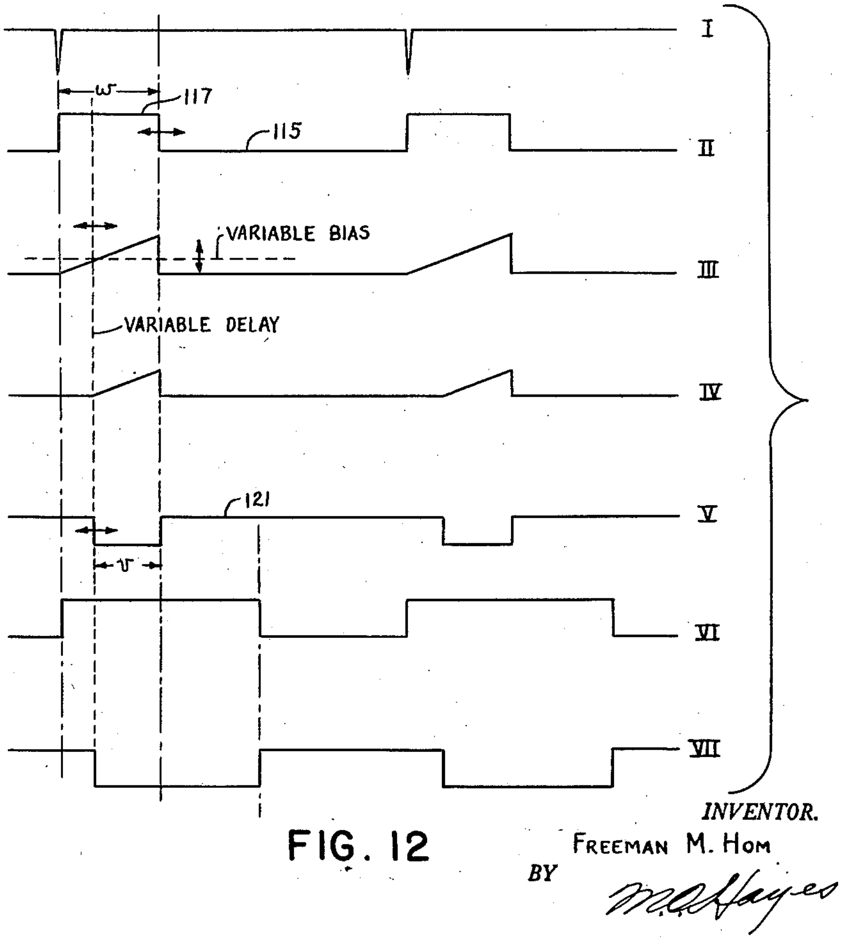
Fig. 12 graphically represents the voltages appearing at various points in the circuit.

In recapitulation, and particularly with respect to the mode of operation of my timing circuit arrangement, reference is made to Figs. 11 and 12, which illustrate, respectively, the principal components of the arrangement and the wave forms of the voltages derived therefrom. Thus, the trigger pulse generator 114 provides triggering pulses at a variable recurrence frequency, the pulses being of the form shown at I in Fig. 12, and corresponding to the wave forms illustrated at Fig. 4.

In response to the triggering pulses, the pulse generator 116 develops variable-width rectangular impulses, as at II in Fig. 12. The width $w$ of the impulses are variable, as indicated by the double arrow associated with the trailing edge, and in accordance with variation of the recurrence frequency of the triggering pulses. Part of the voltage output of the generator 116 is utilized for controlling the "on" and "off" periods of the transmitter 51, the "on" period extending over the time corresponding to the portion 115 of wave form II and the "off" period extending over the time corresponding to the portion 117. Another part of the output of generator 116 is applied to the sawtooth-wave generator 118 for transforming the rectangular impulses into waves of sawtooth form, as shown at III in Fig. 12.

The sawtooth output of generator 118 is applied to the base clipper 120 to which is also applied bias potential from the adjustable bias supply 122 for clipping the base of the sawtooth wave, thereby effectively to alter the time of onset of the voltage rise of the sawtooth wave, as at IV in Fig. 12. It is to be noted that the part of the modified sawtooth output of the clipper 120 is variously utilized as the sweep voltage for the oscilloscope and the reactance tube.

The other part of the output of the clipper 120 is reconverted into a rectangular impulse by the inverter, amplifier and clipper 124 to provide blocking voltage for the receiver and the oscilloscope. The form of such blocking voltage is illustrated in Fig. 12 at V, where the time of the part 119 of a cycle corresponds to the "on" period of the receiver and oscilloscope, and the time of the part 121 of a cycle corresponds to the "off" period. It will be apparent that a variable, although usually small, time delay is provided after the application of the blocking voltage (Fig. 12, II) for the transmitter and the onset of the "on" period of the receiver, during which delay period transient oscillations are permitted to decay. It will be noted that, while the "on" period of the transmitter is here shown as considerably greater than that of the receiver and oscilloscope, which arrangement is desirable for use in radio jamming and similar purposes, the invention is by no means limited to such arrangement since any desired relation of the lengths of the respective "on" periods can be achieved.

It is desirable, however, that the receiver be in blocked or "off" condition when the transmitter is triggered "on," and such an arrangement is hereby ensured. The width $v$ of the receiver-controlling voltage pulse is variable in accordance with the magnitude of the bias applied to the clipper 120 from supply 122. However, although width $v$ is variable, it can never be greater than width $w$ of the transmitter-controlling voltage pulse, inasmuch as the occurence of the trailing edge of receiver-controlling voltage (Fig. 12, V) is determined by the occurrence of the trailing edge of the transmitter-controlling voltage (Fig. 12, II), and is always coexistent or coincident therewith.

Thus, it will be understood that if the width $w$ be expanded (Fig. 12, VI) as by adjustment of the variable-width pulse generator 116, the width $v$ is correspondingly expanded (Fig. 12, VII) without relative displacement in time of the trailing edges of the respective voltage waves. On the other hand, the leading edge of the receiver-controlling voltage (Fig. 12, V) can be displaced in time relative the leading edge of the transmitter-controlling voltage (Fig. 12, II) as by varying the bias potential at the clipper 120, thereby to alter the amount of the time delay.

Certain of the constants in an illustrated example may be desirable. Multivibrator resistors 20 and 22 are 2,000 ohms each and capacitors 24 and 26 are .03 microfarad each for a desired frequency of ten cycles per second. Capacitor 36 of the first differentiating circuit may be .003 microfarad with resistor 38 equal to 10,000 ohms. In the flip-flop unit, resistor 66 may be 450,000 ohms, capacitor 64 may be .01 microfarad and potentiometer 62 may be .25 megohm, with resistors 50 and 52 at 10,000 ohms and 20,000 ohms, respectively, and resistors 54 and 56 at 10,000 ohms and 20,000 ohms, respectively. Tubes 46 and 48 may be two sections of a single-tube type 6SN7. The B voltage may be 300 volts and the voltage regulator 58 should then be 75 volts. With an output signal from tube 72 and resistor 74 and capacitor 76 constituting a saw-tooth generator equal to a peak voltage of approximately 50 volts and with tube 80 as one section of a type 6SN7 and 50,000 ohm potentiometer in its cathode, bias supply 84 should be 15 volts. Differentiating circuit 90, 92 may include a capacitor of .008 microfarad and a resistor of 30,000 ohms. The remainder of constants in the entire circuit are generally not critical and are dependent upon the application to which the system is to be put. Where a single B voltage source is used, it may be necessary to insert RC isolating filters (not shown) in each of the B+ leads.

It will be noted that not only have the transmitter and the monitoring units been properly correlated by the means described and the look-through frequency at interval is adjustably controlled, but a saw-tooth sweep properly synchronized is available for necessary control purposes. Thus, the timer described replaces not only the motor and mechanical contacts in the prior system proposed and increased the flexibility of jamming system control, but also yields the required synchronized saw-tooth control voltage required. While the system described is admirably suited for the purpose for which it is particularly designed, it is evident that its use as a timer extends beyond that particular application. The specific details, abundant in the embodiment above described, are manifestly subject to a wide range of substitution and rearrangement.

It is understood that various modifications and changes may be made in this invention without departing from the spirit and scope thereof as set forth in the appended claims.

What is claimed is:

1. A radio system comprising a radio receiver, a radio transmitter, and apparatus for alternating the on and off periods of said receiver and said transmitter, said apparatus comprising means generating a pair of potentials, one of said potentials being adapted to be applied to said transmitter to render said transmitter inoperative to transmit signals for a first predetermined time interval and the other of said potentials being adapted to be applied to said receiver to render said receiver operative to receive radio signals for a second predetermined time interval, said time intervals having simultaneous terminations and means cooperable with said potential-generating means for providing a time delay between the onset of said first time interval and the onset of said second time interval, said time delay defining an interval during which the receiver and transmitter are both off.

2. A radio system comprising a radio receiver, a radio transmitter, and apparatus for alternating the on and off preiods of said receiver and said transmitter, said apparatus comprising means generating a first potential adapted to be applied to said transmitter to render said transmitter inoperative to transmit signals for a first predetermined time interval, means generating a second potential adapted to be applied to said receiver to render said receiver operative to receive radio signals for a second predetermined time interval, said first and second potentials having substantially coexistent trailing edges, and means providing a time delay between the leading edge of said first potential and the leading edge of said second potential, said time delay defining an interval during which the receiver and transmitter are both off, whereby spurious transient signals from said transmitter are substantially eliminated from said receiver.

3. In a radio jamming system having a radio receiver, and a radio transmitter, apparatus for alternating the on and off periods of said receiver and transmitter, said apparatus comprising means generating a first potential having a fixed leading edge and adapted to be applied to said transmitter to render said transmitter inoperative to transmit signals for a first predetermined time interval, means coupled to said first potential generating means for receiving a portion of said first potential and for generating a second potential having an adjustable leading edge and adapted to be applied to said receiver to render said receiver operative to receive radio signals for a second predetermined time interval, and means in said second potential-generating means for adjusting the occurrence of the leading edge of said second potential, thereby to provide an adjustable time delay between the leading edges of said first potential and said second potential, said time delay defining an interval during which said receiver and transmitter are both off.

4. The apparatus as in claim 3 further characterized in that the first and second potentials have substantially coexistent trailing edges.

5. In a radio system, the combination comprising a radio receiver, a radio transmitter, and apparatus for generating a pair of blocking potentials for alternating the on and off periods of said receiver and said transmitter, said apparatus comprising means generating a first substantially rectangular pulse-wave output, said pulse-wave output having a predetermined pulse width, means for applying a part of said output to said transmitter to render said transmitter inoperative to transmit signals for a first predetermined time interval, means responsive to another part of said pulse-wave output for transforming said other part of said pulse-wave output into a triangular wave form having a time-base portion corresponding to the width of said first rectangular pulse-wave output, means for reducing the magnitude of said time-base portion by a desired amount, and means for converting said reduced-time-base portion triangular wave to a substantially rectangular pulse wave having a pulse width substantially shorter than said predetermined pulse width, and means for applying said reduced-pulse-width rectangular wave to said receiver to render said receiver inoperative to receive radio signals for a second predetermined time interval.

6. A radio interference system comprising a receiver adapted to receive radio signals over a predetermined band of frequencies corresponding to the frequencies of the signals transmitted by a remote transmitter to be jammed, a local transmitter located adjacent said receiver and adapted to transmit radio interference signals over a band of frequencies substantially equal to that of said receiver thereby to interfere with successful operation of said remote transmitter, and means for alternately blocking said receiver and said local transmitter, said blocking means comprising means generating a first substantially rectangular pulse-wave output, said pulse-wave output having a predetermined pulse width, means for applying a part of said output to said local transmitter to render said local transmitter inoperative to transmit signals for a first predetermined time interval, means responsive to another part of said pulse-wave output for transforming said other part of said pulse-wave output into a triangular wave form having a time-base portion corresponding to the width of said first rectangular pulse-wave output, means for reducing the magnitude of said time-base portion by a desired amount, and means for converting said reduced-time-base triangular wave to a substantially rectangular pulse-wave having a pulse width substantially shorter than said predetermined pulse width, and means for applying said reduced-pulse-width rectangular wave to said receiver to render said receiver inoperative to receive radio signals for a second predetermined time interval.

7. A radio jamming system comprising a receiver adapted to receive radio signals over a predetermined band of frequencies corresponding to the frequencies of the signals transmitted by a remote transmitter to be jammed, a local transmitter adjacent said receiver and adapted to transmit radio jamming signals over a band of frequencies substantially equal to that of said receiver, and means for alternately blocking said receiver and said local transmitter, said blocking means comprising means generating a first rectangular potential adapted to be applied to said local transmitter to render the latter inoperative during a first predetermined time interval, means generating a second rectangular potential adapted to be applied to said receiver to render the latter responsive for a second predetermined interval, said potentials having substantially simultaneously occurring trailing edges, and means for providing a time delay between the leading edge of said first potential and the leading edge of said second potential, said time delay defining an interval during which said receiver and said local transmitter are both inoperative.

8. The system defined in claim 7 wherein said first and second potential-generating means further comprise means for simultaneously adjusting the duration of the respective periods of said first and second potentials and for maintaining constant the relative magnitudes of said periods.

9. In combination, a pulse generator adapted to produce trigger pulses having a predetermined repetition frequency and including means for varying said repetition frequency, a multivibrator responsive to said trigger pulses for providing a first substantially rectangular wave output having a frequency value corresponding to the repetition frequency of said trigger pulses, a saw tooth wave generator coupled to said multivibrator for converting a part of the output thereof to a saw tooth wave having a time-base intercept corresponding to the frequency value of said rectangular wave, biasing means for altering the magnitude of said time-base intercept, and means for transforming said altered saw tooth wave to a second substantially rectangular wave in phase opposition to said first rectangular wave and having a frequency value different therefrom by an amount proportional to the alteration of said saw tooth wave, the trailing edges of said first and second rectangular waves being substantially coexistent independently of variation of the relative frequencies thereof, whereby, upon variation of the repetition frequency of said trigger pulses, the frequency values of said first and said second rectangular waves are varied in proportion thereto.

10. In combination, a first pulse generator adapted to produce trigger pulses having a predetermined repetition frequency, a multivibrator responsive to said trigger pulses for providing a first substantially rectangular wave output having a frequency value corresponding to the repetition frequency of said trigger pulses, a saw tooth wave generator coupled to said multivibrator for converting a part of the output thereof to a saw tooth wave having a time-base intercept corresponding to the frequency value of said rectangular wave, biasing means for altering the magnitude of said time-base intercept, and means for transforming said altered saw tooth wave to a second substantially rectangular wave in phase opposition to said first rectangular wave and having a frequency value different therefrom.

11. The combination defined in claim 10 further characterized by means in said multivibrator for varying the frequency value of said first rectangular wave independently of the repetition frequency of said trigger pulses, whereby upon variation of the frequency of said first rectangular wave, the altered time-base intercept of said saw tooth wave is correspondingly varied.

12. Apparatus for generating a pair of control signals, each said signal having respective leading and trailing edges, with the trailing edges of each of said signals being in synchronism and the leading edge of one of said signals lagging the leading edge of the other by a predetermined amount, said apparatus comprising means for generating a pulse, means responsive to said pulse for generating a first control signal voltage of substantially rectangular wave form having leading and trailing edges spaced a predetermined amount, wave-shaping means for transforming a version of said first control signal voltage into a voltage wave of substantially triangular wave form of which the positive slope part has a zero value coincident with the leading edge of said rectangular wave, biasing means for shifting the time of occurrence of the zero value of said positive slope part only and means for converting the modified triangular wave to a second control signal voltage of substantially rectangular wave form.

13. The apparatus defined in claim 12 further characterized by means in said pulse-responsive means for varying the spacing between the leading and trailing edges of said first rectangular wave, whereby upon variation said first rectangular wave, the altered time-base intercept of said saw tooth wave is correspondingly varied and the relative spacing between the respective leading and trailing edges of said first and second rectangular waves is maintained substantially constant.

References Cited in the file of this patent

UNITED STATES PATENTS

| | | |
|---|---|---|
| 2,199,179 | Koch | Apr. 30, 1940 |
| 2,355,363 | Christaldi | Aug. 8, 1944 |
| 2,373,145 | Sensiper et al. | Apr. 10, 1945 |
| 2,399,661 | Bowie | May 7, 1946 |
| 2,402,916 | Schroeder | June 25, 1946 |
| 2,402,917 | Miller | June 25, 1946 |
| 2,403,527 | Hershberger | July 9, 1946 |
| 2,405,930 | Goldberg et al. | Aug. 13, 1946 |
| 2,412,991 | Labin | Dec. 24, 1946 |
| 2,416,088 | Deerhake | Feb. 18, 1947 |
| 2,418,139 | Preisman | Apr. 1, 1947 |
| 2,470,939 | Miller | May 24, 1949 |
| 2,487,522 | Chandeland | Nov. 8, 1949 |
| 2,496,998 | Hershberger | Feb. 7, 1950 |